US012444389B2

(12) United States Patent
Hwang

(10) Patent No.: US 12,444,389 B2
(45) Date of Patent: Oct. 14, 2025

(54) MURA COMPENSATION DEVICE AND MURA COMPENSATION SYSTEM INCLUDING THE SAME

(71) Applicant: Samsung Display Co., LTD., Yongin-si (KR)

(72) Inventor: Jong-Kwang Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/760,654

(22) Filed: Jul. 1, 2024

(65) Prior Publication Data

US 2025/0029577 A1 Jan. 23, 2025

(30) Foreign Application Priority Data

Jul. 19, 2023 (KR) ........................ 10-2023-0093969

(51) Int. Cl.
*G09G 5/10* (2006.01)

(52) U.S. Cl.
CPC ....... *G09G 5/10* (2013.01); *G09G 2320/0233* (2013.01); *G09G 2320/0285* (2013.01)

(58) Field of Classification Search
CPC ............. G09G 5/10; G09G 2320/0233; G09G 2320/0285; G09G 3/20; G09G 2320/0271; G09G 3/32; G09G 3/006; G09G 2320/0693; G09G 2330/10
See application file for complete search history.

(56) References Cited

U.S. PATENT DOCUMENTS

2016/0027354 A1* 1/2016 Terai .................... G09G 3/3611 345/87
2017/0243562 A1* 8/2017 Hu .......................... G09G 5/10
2019/0384561 A1* 12/2019 Jung ....................... G09G 3/32
2020/0193898 A1* 6/2020 Wang ...................... G09G 3/20
2022/0165220 A1* 5/2022 Kim ........................ G09G 5/10

FOREIGN PATENT DOCUMENTS

KR 2018062585 A * 6/2018 .......... G09G 3/3233
KR 1020180062585 A 6/2018
KR 102151262 B1 9/2020

* cited by examiner

*Primary Examiner* — Rodney Amadiz
(74) *Attorney, Agent, or Firm* — CANTOR COLBURN LLP

(57) ABSTRACT

A mura compensation device includes a first memory which stores a grayscale compensation value of a reference pixel defined by m×n pixels included in a display panel, and a weight, where each of m and n is a positive integer equal to or greater than 2, a second memory which receives the grayscale compensation value from the first memory and stores the grayscale compensation value, and a compensator which applies the grayscale compensation value and the weight to grayscale data to generate compensated grayscale data. The compensator applies an individual weight to the weight depending on a normal state or defective states of the display panel to adjust the weight.

20 Claims, 8 Drawing Sheets

FIG. 6

| Case1: NORMAL STATE | | Case2: FIRST DEFECTIVE STATE | | Case3: SECOND DEFECTIVE STATE | | Case4: THIRD DEFECTIVE STATE | |
|---|---|---|---|---|---|---|---|
| DBV | WG | DBV | WG | DBV | WG | DBV | WG |
| HBM | R/G/B | HBM | R/G/B | HBM | R/G/B | HBM | R/G/B |
| 33G | 0 | 33G | 0 | 33G | 0 | 33G | 0 |
| 22G | 16 | 22G | 16 | 22G | 13 | 22G | 8 |
| 12G | 16 | 12G | 16 | 12G | 13 | 12G | 5 |
| 9G | 16 | 9G | 16 | 9G | 13 | 9G | 4 |
| 7G | 12 | 7G | 12 | 7G | 10 | 7G | 3 |
| 3G | 5 | 3G | 5 | 3G | 4 | 3G | 1 |
| 0G | 0 | 0G | 0 | 0G | 0 | 0G | 0 |
| Max | R/G/B | Max | R/G/B | Max | R/G/B | Max | R/G/B |
| 33G | 0 | 33G | 0 | 33G | 0 | 33G | 0 |
| 22G | 16 | 22G | 16 | 22G | 13 | 22G | 8 |
| 12G | 16 | 12G | 16 | 12G | 13 | 12G | 5 |
| 9G | 16 | 9G | 16 | 9G | 13 | 9G | 4 |
| 7G | 12 | 7G | 12 | 7G | 10 | 7G | 3 |
| 3G | 5 | 3G | 5 | 3G | 4 | 3G | 1 |
| 0G | 0 | 0G | 0 | 0G | 0 | 0G | 0 |
| 80nit | R/G/B | 80nit | R/G/B | 80nit | R/G/B | 80nit | R/G/B |
| 33G | 0 | 33G | 0 | 33G | 0 | 33G | 0 |
| 22G | 16 | 22G | 8 | 22G | 8 | 22G | 8 |
| 12G | 16 | 12G | 5 | 12G | 5 | 12G | 5 |
| 9G | 13 | 9G | 4 | 9G | 4 | 9G | 4 |
| 7G | 10 | 7G | 3 | 7G | 3 | 7G | 3 |
| 3G | 4 | 3G | 1 | 3G | 1 | 3G | 1 |
| 0G | 0 | 0G | 0 | 0G | 0 | 0G | 0 |
| 40nit | R/G/B | 40nit | R/G/B | 40nit | R/G/B | 40nit | R/G/B |
| 33G | 0 | 33G | 0 | 33G | 0 | 33G | 0 |
| 22G | 16 | 22G | 8 | 22G | 8 | 22G | 8 |
| 12G | 16 | 12G | 5 | 12G | 5 | 12G | 5 |
| 9G | 13 | 9G | 4 | 9G | 4 | 9G | 4 |
| 7G | 10 | 7G | 3 | 7G | 3 | 7G | 3 |
| 3G | 4 | 3G | 1 | 3G | 1 | 3G | 1 |
| 0G | 0 | 0G | 0 | 0G | 0 | 0G | 0 |

| Case1: NORMAL STATE | | Case2: FIRST DEFECTIVE STATE | | Case3: SECOND DEFECTIVE STATE | | Case4: THIRD DEFECTIVE STATE | |
|---|---|---|---|---|---|---|---|
| DBV | WG | DBV | WG | DBV | WG | DBV | WG |
| 20nit | R/G/B | 20nit | R/G/B | 20nit | R/G/B | 20nit | R/G/B |
| 33G | 0 | 33G | 0 | 33G | 0 | 33G | 0 |
| 22G | 16 | 22G | 8 | 22G | 8 | 22G | 8 |
| 12G | 16 | 12G | 5 | 12G | 5 | 12G | 5 |
| 9G | 13 | 9G | 4 | 9G | 4 | 9G | 4 |
| 7G | 10 | 7G | 3 | 7G | 3 | 7G | 3 |
| 3G | 4 | 3G | 1 | 3G | 1 | 3G | 1 |
| 0G | 0 | 0G | 0 | 0G | 0 | 0G | 0 |
| 10nit | R/G/B | 10nit | R/G/B | 10nit | R/G/B | 10nit | R/G/B |
| 33G | 0 | 33G | 0 | 33G | 0 | 33G | 0 |
| 22G | 16 | 22G | 8 | 22G | 8 | 22G | 8 |
| 12G | 16 | 12G | 5 | 12G | 5 | 12G | 5 |
| 9G | 13 | 9G | 4 | 9G | 4 | 9G | 4 |
| 7G | 10 | 7G | 3 | 7G | 3 | 7G | 3 |
| 3G | 4 | 3G | 1 | 3G | 1 | 3G | 1 |
| 0G | 0 | 0G | 0 | 0G | 0 | 0G | 0 |
| 5nit | R/G/B | 5nit | R/G/B | 5nit | R/G/B | 5nit | R/G/B |
| 33G | 0 | 33G | 0 | 33G | 0 | 33G | 0 |
| 22G | 12 | 22G | 6 | 22G | 6 | 22G | 6 |
| 12G | 6 | 12G | 4 | 12G | 4 | 12G | 4 |
| 9G | 4 | 9G | 3 | 9G | 3 | 9G | 3 |
| 7G | 3 | 7G | 2 | 7G | 2 | 7G | 2 |
| 3G | 1 | 3G | 1 | 3G | 1 | 3G | 1 |
| 0G | 0 | 0G | 0 | 0G | 0 | 0G | 0 |
| 2nit | R/G/B | 2nit | R/G/B | 2nit | R/G/B | 2nit | R/G/B |
| 33G | 0 | 33G | 0 | 33G | 0 | 33G | 0 |
| 22G | 12 | 22G | 6 | 22G | 6 | 22G | 6 |
| 12G | 6 | 12G | 4 | 12G | 4 | 12G | 4 |
| 9G | 4 | 9G | 3 | 9G | 3 | 9G | 3 |
| 7G | 3 | 7G | 2 | 7G | 2 | 7G | 2 |
| 3G | 1 | 3G | 1 | 3G | 1 | 3G | 1 |
| 0G | 0 | 0G | 0 | 0G | 0 | 0G | 0 |

MURA COMPENSATION DEVICE AND MURA COMPENSATION SYSTEM INCLUDING THE SAME

This application claims priority to Korean Patent Application No. 10-2023-0093969, filed on Jul. 19, 2023, and all the benefits accruing therefrom under 35 U.S.C. § 119 the content of which in its entirety is herein incorporated by reference.

BACKGROUND

1. Field

Embodiments of the invention relate to a mura compensation device and a mura compensation system including the mura compensation device. More particularly, embodiments of the invention relate to a mura compensation device and a mura compensation system including the mura compensation device for removing mura.

2. Description of the Related Art

Generally, a display device may include a display panel and a display panel driver. The display panel may include gate lines, data lines, and pixels. The display panel driver may include a gate driver for providing gate signals to the gate lines, a data driver for providing data voltages to the data lines, and a driving controller for controlling the gate driver and the data driver.

Before the display device is shipped, an inspection may be performed to ensure a quality of the display device. The quality assurance inspection may include an incoming quality control (IQC) performed before a process, a link quality control (LQC) performed during the process, and an outgoing quality control (OQC) performed at a time of shipment.

SUMMARY

Even if a display device is manufactured under strict conditions such as a temperature management and a humidity management, a characteristic of each of pixels of the display device may be different from each other. Therefore, even if same grayscale data is applied to the pixels, luminances of the pixels applied with the same grayscale data may be different from each other, that is, nonuniform, and the luminance difference may be perceived by a user as a stain. Such a stain may be referred to as a mura.

Embodiments of the invention provide a mura compensation device which removes a mura of a display device.

Embodiments of the invention provide a mura compensation system including the mura compensation device.

In an embodiment of a mura compensation device according to the invention, the mura compensation device includes a first memory, a second memory, and a compensator. In such an embodiment, the first memory stores a grayscale compensation value of a reference pixel defined by m×n pixels included in a display panel, and a weight, where each of m and n is a positive integer equal to or greater than 2. In such an embodiment, the second memory receives the grayscale compensation value from the first memory and store the grayscale compensation value. In such an embodiment, the compensator applies the grayscale compensation value and the weight to grayscale data to generate compensated grayscale data. In such an embodiment, the compensator applies an individual weight to the weight depending on a normal state or defective states of the display panel to adjust the weight.

In an embodiment, the mura compensation device may further include a computer which obtains a luminance compensation value of the reference pixel based on a representative luminance value of the reference pixel, and obtains the grayscale compensation value based on the luminance compensation value of the reference pixel.

In an embodiment, the representative luminance value of the reference pixel may be an average luminance value, a maximum luminance value, or a minimum luminance value of the reference pixel.

In an embodiment, the computer may obtain a representative luminance value of a reference pixel located at a center of the display panel as a target luminance value of each of reference pixels.

In an embodiment, the computer may obtain a difference between the representative luminance value and the target luminance value as the luminance compensation value.

In an embodiment, the grayscale data may include an input grayscale and an input luminance, which is a maximum luminance of an image generated based on the input grayscale, and the weight may be obtained based on the input luminance and the input grayscale.

In an embodiment, the weight may be obtained based on the input grayscale, the input luminance, and a driving frequency of the display panel.

In an embodiment, the weight stored in the first memory may be a reference weight corresponding to each of reference grayscales and each of reference luminances.

In an embodiment, when the input grayscale is equal to one of the reference grayscales and the input luminance is equal to one of the reference luminances, the compensator may obtain the reference weight as the weight.

In an embodiment, when the input grayscale is different from the reference grayscales or the input luminance is different from the reference luminances, the compensator may be configured to interpolate the reference grayscales and the reference luminances to obtain a weight corresponding to the input luminance and the input grayscale.

In an embodiment, when the display panel is driven in a brightness control (BC) mode including a dimming mode (DIM) and a high brightness mode (HBM), the compensator may further adjust the weight.

In an embodiment, the normal state and the defective states may be classified by a quality assurance inspection of the display panel.

In an embodiment, when the display panel is in the normal state, the weight may not be adjusted, and when the display panel is in one of the defective states, the weight may be adjusted.

In an embodiment, the individual weight may be set differently depending on the defective states of the display panel.

In an embodiment, the individual weight may be stored in the compensator or the first memory.

In an embodiment, the compensator may acquire a grayscale compensation value of a specific pixel of the reference pixel and a grayscale compensation value of a specific pixel of a peripheral reference pixel adjacent to the reference pixel, and the compensator may interpolate the grayscale compensation value of the specific pixel of the reference pixel and the grayscale compensation value of the specific pixel of the peripheral reference pixel to obtain a grayscale compensation value of other pixels excluding the specific pixel of the reference pixel.

In an embodiment, the grayscale compensation value stored in the first memory may be a reference grayscale compensation value corresponding to each of reference grayscales.

In an embodiment, when an input grayscale of the specific pixel of the reference pixel or the peripheral reference pixel is equal to one of the reference grayscales, the compensator may obtain the reference grayscale compensation value as the grayscale compensation value.

In an embodiment, when the input grayscale of the specific pixel of the reference pixel or the peripheral reference pixel is different from the reference grayscales, the compensator may interpolate the reference grayscales to obtain a grayscale compensation value corresponding to the input grayscale of the specific pixel of the reference pixel or the peripheral reference pixel.

In an embodiment of a mura compensation system according to the invention, the mura compensation system includes a first memory, a second memory, a compensator, and a data driver. In such an embodiment, the first memory stores a grayscale compensation value of a reference pixel defined by m×n pixels included in a display panel, and a weight, where each of m and n are a positive integer of 2 or greater. In such an embodiment, the second memory receives the grayscale compensation value from the first memory and stores the grayscale compensation value. In such an embodiment, the compensator applies the grayscale compensation value and the weight to grayscale data to generate compensated grayscale data. In such an embodiment, the data driver generates a data voltage based on the compensated grayscale data and applies the data voltage to the display panel. In such an embodiment, the compensator applies an individual weight to the weight depending on a normal state or defective states of the display panel to adjust the weight.

According to the mura compensation device and the mura compensation system according to the embodiments, the mura compensation device and the mura compensation system may generate the grayscale compensation value depending on the grayscale data to compensate the grayscale data, apply the weight to the grayscale data to compensate the grayscale data in detail, and additionally or selectively apply the individual weight to the weight depending on the normal state or the defective states of the display panel to improve the overcompensation of the grayscale data due to application of the weight. Accordingly, the mura of the display device may be effectively removed.

BRIEF DESCRIPTION OF THE DRAWINGS

The above and other features of embodiments of the invention will become more apparent by describing in detailed embodiments thereof with reference to the accompanying drawings, in which:

FIG. 6 is a table illustrating an individual weight obtained based on a reference grayscale and a reference luminance;

DETAILED DESCRIPTION

Figure 1:
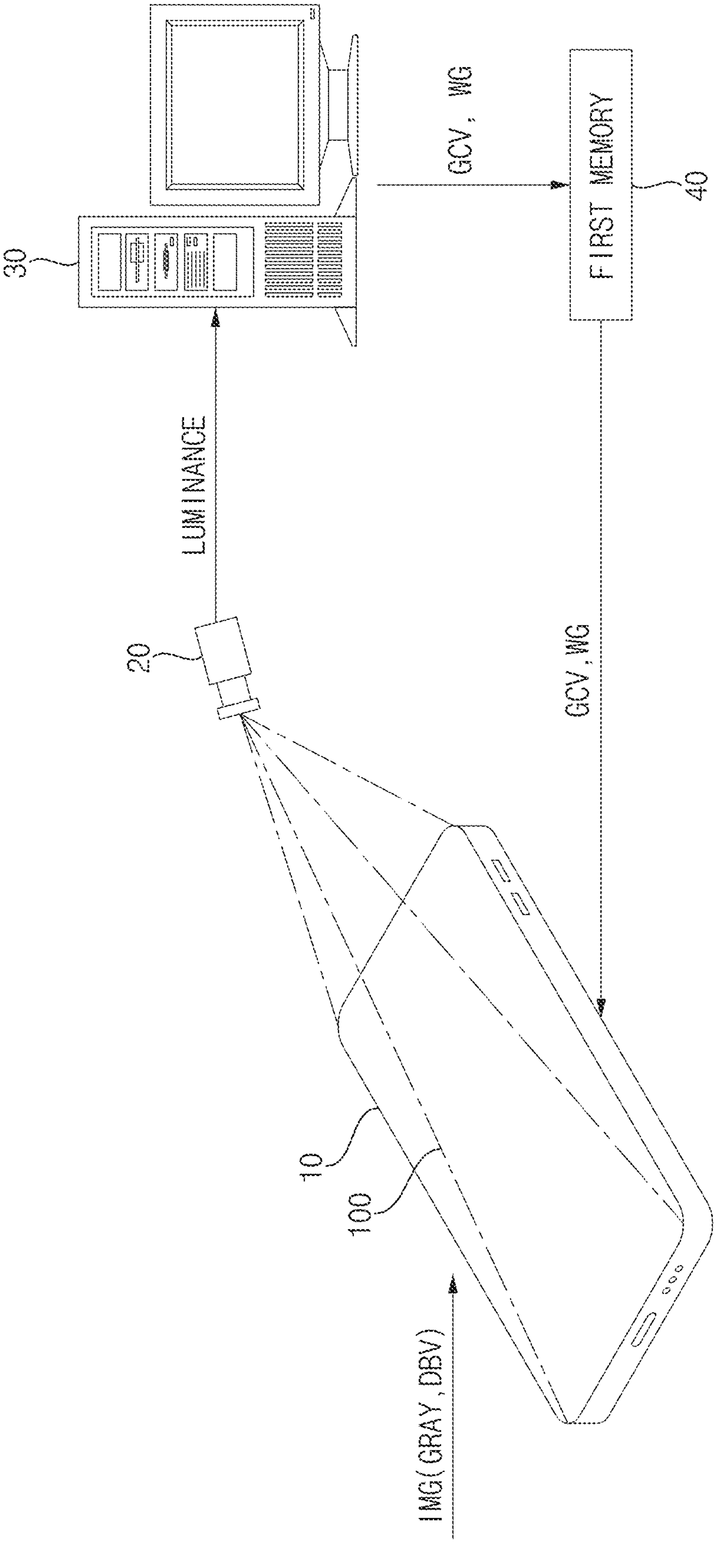
FIGS. 1 and 2 are conceptual diagrams illustrating a mura compensation device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
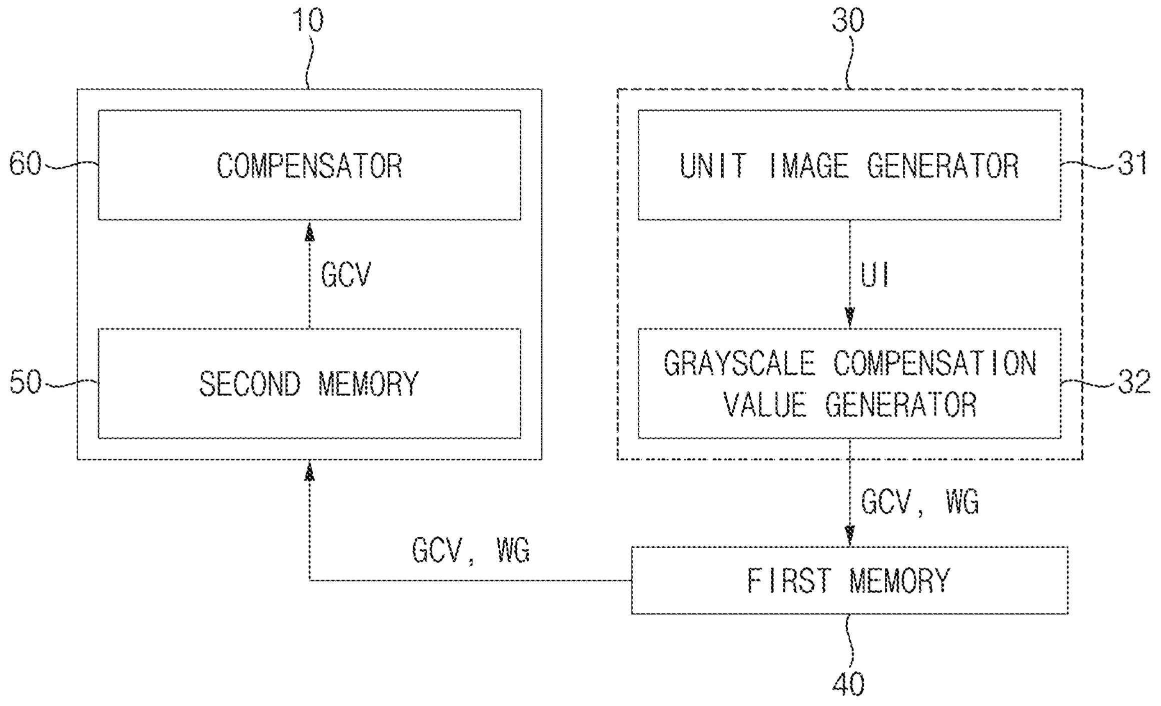
Figure 3:
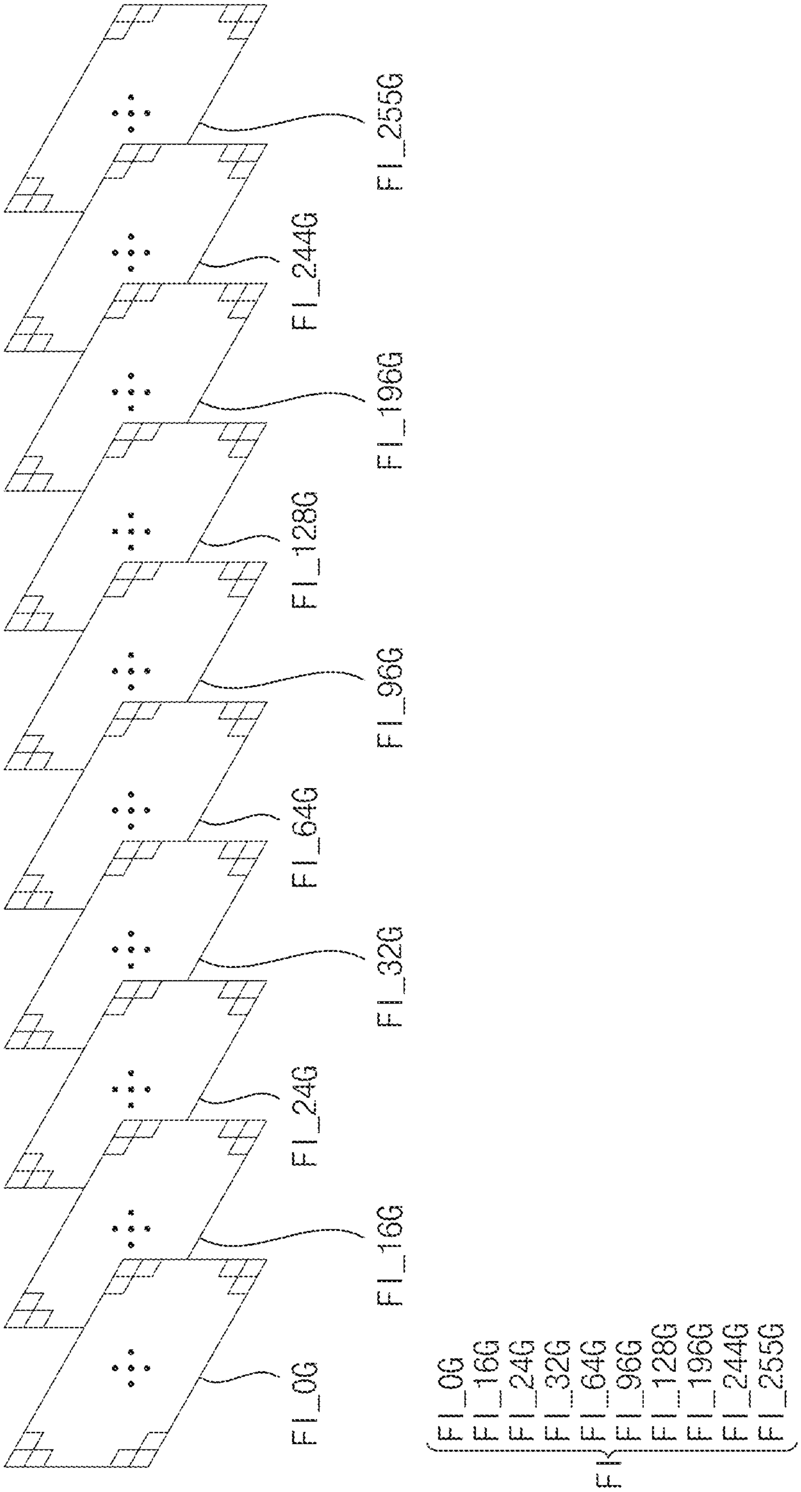
FIG. 3 is a conceptual diagram illustrating reference grayscale images.
Figure 4:
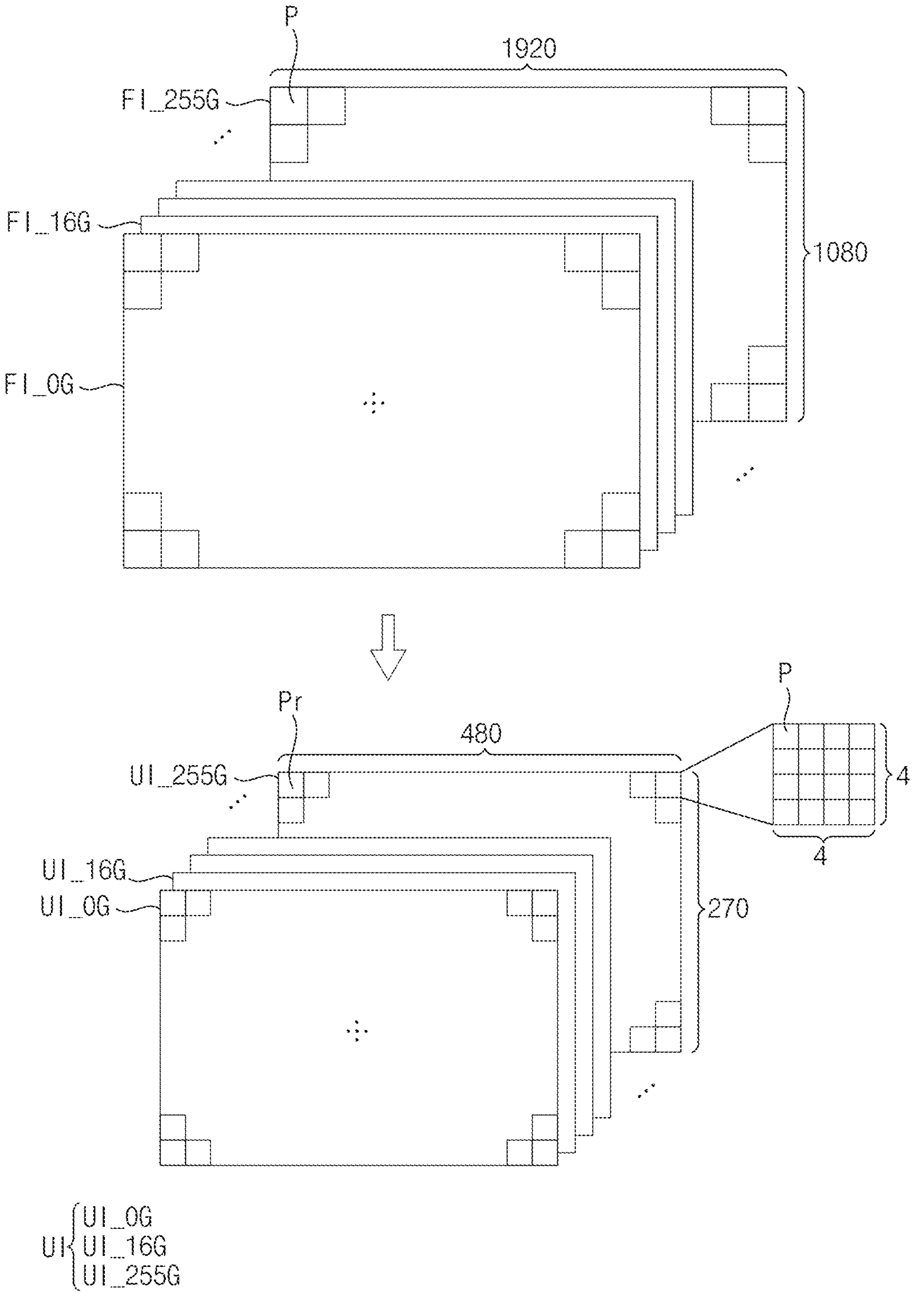
FIG. 4 is a conceptual diagram illustrating reference unit images corresponding to reference grayscale images of FIG. 2.
Figure 5:
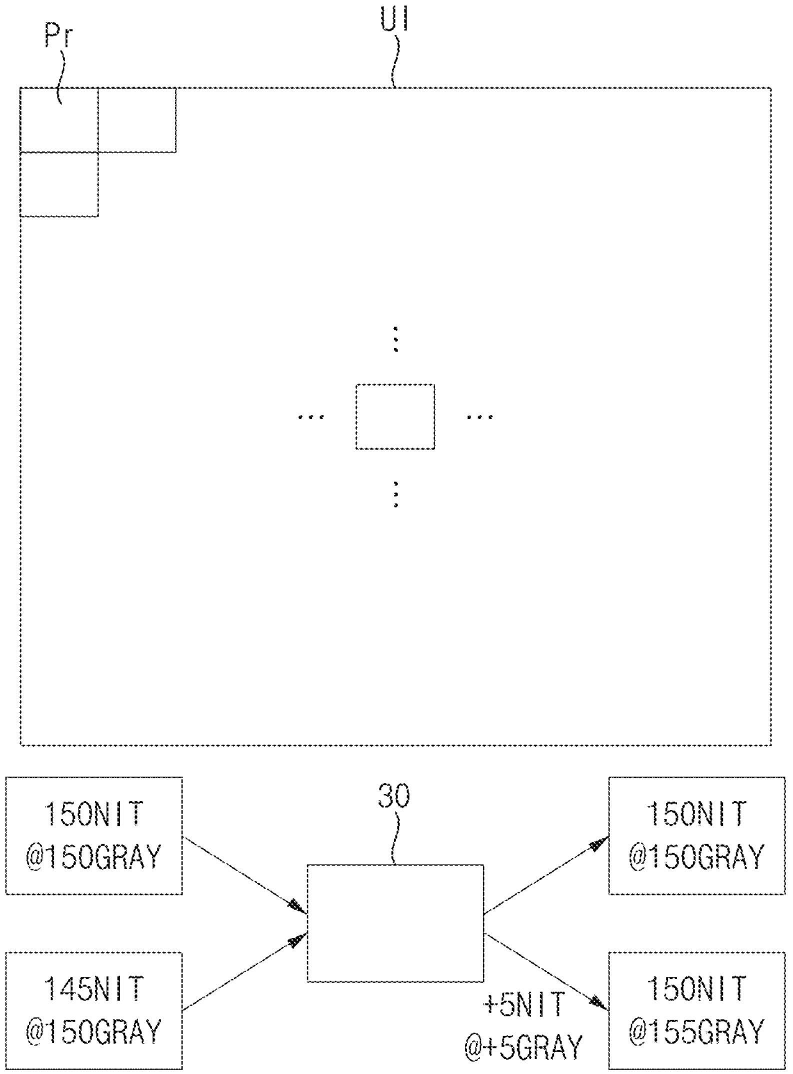
FIG. 5 is a conceptual diagram illustrating an operation of obtaining a grayscale compensation value based on a luminance compensation value.

FIGS. 1 and 2 are conceptual diagrams illustrating a mura compensation device according to an embodiment of the invention. FIG. 3 is a conceptual diagram illustrating reference grayscale images. FIG. 4 is a conceptual diagram illustrating reference unit images corresponding to reference grayscale images of FIG. 2. FIG. 5 is a conceptual diagram illustrating an operation of obtaining a grayscale compensation value based on a luminance compensation value.

Referring to FIGS. 1 to 5, a quality assurance inspection may be performed on a display device 10 using a mura compensation device according to an embodiment of the invention. In an embodiment, the mura compensation device may include a camera 20, a computer 30, a first memory 40, a second memory 50, and a compensator 60. In an embodiment, the second memory 50 and the compensator 60 may be included in the display device 10. The display device 10 may receive grayscale data IMG for a mura test, and a display panel 100 included in the display device 10 may display an image for the mura test based on the grayscale data IMG.

When the quality assurance inspection is performed, the display panel 100 may display an image generated based on K reference grayscales (K is a positive integer equal to or greater than 2). The image generated based on the reference grayscales may be referred to as a reference grayscale image FI. For example, the K reference grayscales may include 10 reference grayscales for 0 to 255 grayscales, and the 10 reference grayscales may include 0 grayscale, 16 grayscale, 24 grayscale, 32 grayscale, 64 grayscale, 128 grayscale, 160 grayscale, 192 grayscale, 224 grayscale, and 255 grayscale, and reference images FI_0G to FI_255G may be generated based thereon as shown in FIG. 3.

The grayscale data IMG may include an input grayscale GRAY and an input luminance DBV which is a maximum luminance of an image generated based on the input grayscale GRAY. In an embodiment, the grayscale data IMG may further include an input frequency. In an embodiment, the grayscale data IMG may be pentile grayscale data.

The display panel 100 may include pixels P. In a case where the display device 10 has M×N resolution (M, N are each positive integers equal to or greater than 2), an image of the display panel 100 may be displayed by M×N pixels P. Each of the pixels P may include sub-color pixels. For example, the sub-color pixels may include a red pixel for displaying a red image, a green pixel for displaying a green image, and a blue pixel for displaying a blue image. For example, the display panel 100 may have 1920×1080 resolution corresponding to 1920×1080 pixels.

Even if same grayscale data IMG is applied to the pixels P, a luminance of each of the pixels P may be different from each other depending on a characteristic of each of the pixels P, and the luminance difference may be visible to a user as a stain. In particular, the stain on the display panel 100 in the quality assurance inspection may be referred to as a mura.

The camera 20 may optically capture the reference grayscale image FI. The camera 20 may be a character coupled device (CCD) camera. The camera 20 may output the captured image to the computer 30. In an embodiment, for example, as shown in FIG. 3, the camera 20 may optically capture 10 reference grayscale images FI generated based on the 10 reference grayscales.

The computer 30 may include a unit image generator 31 and a grayscale compensation value generator 32.

The unit image generator 31 may measure a luminance of the reference grayscale image FI having the M×N resolution. The unit image generator 31 may convert the reference grayscale image FI having M×N resolution into a reference unit image UI having P×Q resolution using a reference pixel Pr defined by m×n pixels P (m, n are each positive integers equal to or greater than 2). In an embodiment, for example, the unit image generator 31 may convert a reference grayscale image FI having a 1920×1080 resolution into a reference unit image UI having a 480×270 resolution using a reference pixel Pr defined by 4×4 pixels P. In an embodiment, for example, as shown in FIG. 4, the unit image generator 31 may generate 10 reference unit images UI_0G to UI_255G based on the 10 reference grayscale images FI_0G to FI_255G.

The unit image generator 31 may obtain a representative luminance value of each of the reference pixels Pr for the reference unit image UI based on the measured luminance of the reference grayscale image FI. In an embodiment, the luminance representative value may be obtained based on the measured luminance of each of the m×n pixels P included in the reference pixel Pr. In an embodiment, the representative luminance value may be an average luminance value, a maximum luminance value, or a minimum luminance value of the m×n pixels P included in the reference pixel Pr. Since one reference unit image UI corresponding to one reference grayscale has a P×Q representative luminance value, the unit image generator 31 may K×P×Q representative luminance value corresponding to the P×Q reference pixels Pr for the K reference grayscales.

The grayscale compensation value generator 32 may generate a luminance compensation value based on the representative luminance value of the reference pixel Pr. In an embodiment, for example, the grayscale compensation value generator 32 may obtain a target luminance value of each of the reference pixels Pr based on a representative luminance value of a reference pixel Pr located at a center of the display panel 100. The grayscale compensation value generator 32 may obtain a difference between the representative luminance value of each of the reference pixels Pr and the target luminance value of each of the reference pixels Pr as the luminance compensation value. In an embodiment, for example, as shown in FIG. 5, when the input grayscale GRAY is 150 grayscale, the representative luminance value of the reference pixel Pr located at the center of the display panel 100, that is, a central reference pixel Pr, may be 150 nit, and a representative luminance value of a reference pixel Pr excluding the central reference pixel Pr may be 145 nit. Therefore, the grayscale compensation value generator 32 may obtain 150 nit as the target luminance value of the reference pixel Pr excluding the central reference pixel Pr, and obtain 5 nit which is a difference between 150 nit and 145 nit as the luminance compensation value of the reference pixels Pr excluding the central reference pixel Pr. The grayscale compensation value generator 32 may obtain K×P×Q luminance compensation values corresponding to the K reference grayscales and the P×Q reference pixels Pr.

The grayscale compensation value generator 32 may obtain a grayscale compensation value GCV based on the luminance compensation value. The grayscale compensation value generator 32 may implement the target luminance value by applying the grayscale compensation value GCV to the reference grayscale of the reference pixel Pr excluding the central reference pixel Pr. In an embodiment, for example, when the input grayscale GRAY is 150 grayscale, the luminance compensation value is 5 nit, and the grayscale compensation value GCV is 5 grayscale, the grayscale compensation value generator 32 may additionally apply 5 grayscale to 150 grayscale to implement 150 nit. The grayscale compensation value generator 32 may obtain K×P×Q grayscale compensation values GCV corresponding to the K reference grayscales and the P×Q reference pixels Pr.

In an embodiment, the computer 30 may include one or more processors; memory that stores instructions that, when executed by the one or more processors, cause the computer 30 to perform operations of the unit image generator 31 or the grayscale compensation value generator 32.

The first memory 40 may receive and store the grayscale compensation value GCV. In an embodiment, the first memory 40 may be a flash memory. The flash memory may retain stored information even when a power is turned off. However, the first memory 40 is not limited to the flash memory. The first memory 40 may further store a weight WG. The weight WG stored in the first memory 40 may be a reference weight corresponding to each of the reference grayscales and each of reference luminances. Each of the reference luminances may be a maximum luminance of an image generated based on the reference grayscale. In an embodiment, the weight WG may be obtained based on a reference frequency as well as the reference grayscale and the reference luminance. A driving frequency of the display panel 100 may be obtained based on the reference frequency. However, for convenience of description, embodiments where the weight WG is obtained based on the reference grayscale and the reference luminance will be described.

The second memory 50 may receive and store the grayscale compensation value GCV In an embodiment, the second memory 50 may be a static RAM (SRAM) memory.

The compensator 60 may receive the grayscale data IMG corresponding to each of the M×N pixels P from an external device (not shown), and the grayscale data IMG may be compensated by applying a grayscale offset generated using the grayscale compensation value GCV and the weight WG to the grayscale data IMG. The grayscale offset may be a difference between the grayscale data IMG and a data signal generated by compensating the grayscale data IMG.

The compensator 60 may obtain a grayscale compensation value GCV of a specific pixel of the reference pixel Pr and a grayscale compensation value GCV of a specific pixel of a peripheral reference pixel adjacent to the reference pixel Pr, interpolate the grayscale compensation value GCV of the specific pixel of the reference pixel Pr and the grayscale compensation value GCV of the specific pixel of the peripheral reference pixel to obtain a grayscale compensation value GCV of other pixels P excluding the specific pixel of the reference pixel Pr. The grayscale compensation value GCV stored in the first memory 40 may be a reference grayscale compensation value corresponding to each of the reference grayscales.

When an input grayscale GRAY of the specific pixel of the reference pixel Pr or the peripheral reference pixel is equal to one of the reference grayscales, the compensator 60 may obtain the reference grayscale compensation value as the grayscale compensation value GCV When the input grayscale GRAY of the specific pixel of the reference pixel Pr or the peripheral reference pixel is different from the reference grayscales, the compensator 60 may interpolate the reference grayscales to obtain a grayscale compensation value GCV corresponding to the input grayscale GRAY of the specific pixel of the reference pixel Pr or the peripheral reference pixel.

In an embodiment, the mura of the display panel 100 may show different aspects or occur differently depending on the input grayscale GRAY and the input luminance DBV. Accordingly, the compensator 60 may compensate the grayscale data IMG in detail depending on the grayscale data IMG including the input grayscale GRAY and the input luminance DBV In an embodiment, the compensator 60 may apply the grayscale compensation value GCV to the grayscale data IMG, and the compensator 60 may selectively apply the weight WG to the grayscale compensation value GCV when it is determined or instructed that the grayscale data IMG is to be compensated in detail depending on the input grayscale GRAY and the input luminance DBV The weight WG may be adjusted in various operation modes. When the display panel 100 is driven in a brightness control (BC) mode, the compensator 60 may adjust the weight WG. In an embodiment, the BC mode may include a dimming (DIM) mode and a high brightness mode (HBM) mode. The DIM mode may be an operation mode which reduces a maximum brightness of an image displayed on the display panel 100 based on the grayscale data IMG to reduce a power consumption of the display device 10, and the HBM mode may be an operation mode which increases the maximum luminance of the image displayed on the display panel 100 based on the grayscale data IMG to increase a visibility of the image in an outdoor environment.

In an embodiment, when the input grayscale GRAY is equal to one of the reference grayscales corresponding to the weight WG stored in the first memory 40, and the input luminance DBV is equal to one of the reference luminances corresponding to the weight WG stored in the first memory 40, the compensator 60 may obtain a reference weight as the weight WG.

In an embodiment, when the input grayscale GRAY is different from the reference grayscale corresponding to the weight WG stored in the first memory 40, or the input luminance DBV is different from the reference luminance corresponding to the weight WG stored in the first memory 40, the compensator 60 may interpolate the reference grayscale and the reference luminance to obtain a weight WG corresponding to the input luminance DBV and the input grayscale GRAY.

In an embodiment, when the weight WG is applied to the display device 10, an overcompensation phenomenon in which green or pink color rather stands out in a partial region of the display panel 100 may occur depending on an image brightness (particularly, a low brightness and a low grayscale). In the overcompensation phenomenon, a small difference in a current may occur in each of the pixels P, and the small difference in the current may occur as a small difference in a luminance. In particular, the overcompensation phenomenon may become worse depending on materials of the pixels P. In this case, when an existing weight WG is applied to the display device 10 as it is, the overcompensation phenomenon may stand out further in the partial region of the display panel 100.

Depending on a degree of the overcompensation phenomenon, the display panel 100 may be classified into a normal state or defective states through the quality assurance inspection, and the normal states or defective states may be classified by a person or a computer depending on types of the mura. In an embodiment, the quality assurance inspection may be an outgoing quality control (OQC). The normal state may be a state in which the overcompensation phenomenon does not exist in the display panel 100, and the defective states may be a state in which the overcompensation phenomenon exists in the display panel 100.

Therefore, when the display panel 100 is in one of the defective states, the weight WG may be additionally adjusted by applying an individual weight thereto depending on the defective states. The individual weights may vary depending on the defect states. When the display panel 100 is in the normal state, the weight WG may not be additionally adjusted by the individual weight. The compensator 60 may apply the grayscale compensation value GCV and the weight WG to the grayscale data IMG, and the compensator 60 may selectively apply the individual weight to the weight WG when it is determined or instructed that the grayscale data IMG is to be compensated in detail depending on the defective states. The individual weight may be a number between 0 and 1, and a value obtained by multiplying the individual weight and the weight WG may be applied to the grayscale compensation value GCV When the individual weight is 0, the weight WG may be adjusted to 0, and the weight WG may not be applied to the grayscale compensation value GCV When the individual weight is 1, the weight WG may not be adjusted, and the weight WG may be directly applied to the grayscale compensation value GCV. In an embodiment, the individual weight may be stored in the compensator 60 or in another component included in the display device 10 separately from the compensator 60. In an embodiment, the individual weight may be stored in the first memory 40.

FIG. 6 is a table illustrating an individual weight obtained based on a reference grayscale and a reference luminance.

Referring to FIG. 6, for example, as shown in FIG. 6, the display panel 100 is classified into four states (i.e., a normal state and three defective states) depending on the degree of the overcompensation phenomenon. In FIG. 6, HBM may be an input luminance of the HBM mode, and MAX may be a luminance lower than the input luminance of the HBM mode.

When the display panel 100 is in the normal state, the individual weight may be 1. That is, when the display panel 100 is in the normal state, the compensator 60 may not adjust the weight WG. For example, when the display panel 100 is in the normal state, the input luminance DBV is 80 nit, and the input grayscale GRAY is 33 grayscale, the individual weight may be 1 and the weight WG may be 0(=0×1) and. For example, when the display panel 100 is in the normal state, the input luminance DBV is 80 nit, and the input grayscale GRAY is 22 grayscale, the individual weight may be 1 and the weight WG may be 16(=16×1). For example, when the display panel 100 is in the normal state, the input luminance DBV is 80 nit, and the input grayscale GRAY is 12 grayscale, the individual weight may be 1 and the weight WG may be 16(=16×1). For example, when the display panel 100 is in the normal state, the input luminance DBV is 80 nit, and the input grayscale GRAY is 9 grayscale, the individual weight may be 1 and the weight WG may be 13(=13×1). For example, when the display panel 100 is in the normal state, the input luminance DBV is 80 nit, and the input grayscale GRAY is 7 grayscale, the individual weight may be 1 and the weight WG may be 10(=10×1). For example, when the display panel 100 is in the normal state, the input luminance DBV is 80 nit, and the input grayscale GRAY is 3 grayscale, the individual weight may be 1 and the weight WG may be 4(=4×1). For example, when the display panel 100 is in the normal state, the input luminance DBV is 80 nit, and the input grayscale GRAY is 0 grayscale, the individual weight may be 1 and the weight WG may be 0(=0×1).

When the display panel 100 is in one of the defective states, the individual weight may be between 0 and 1. For example, when the display panel 100 is in a first defective state, the input luminance DBV is 80 nit, and the input grayscale GRAY is 33 grayscale, the individual weight may be 1 and the weight WG may be 0(=0×1). For example, when the display panel 100 is in the first defective state, the input luminance DBV is 80 nit, and the input grayscale GRAY is 22 grayscale, the individual weight may be $8/16$ and the weight WG may be 8(=16×$8/16$). For example, when the display panel 100 is in the first defective state, the input luminance DBV is 80 nit, and the input grayscale GRAY is 12 grayscale, the individual weight may be $5/16$ and the weight WG may be 5(=16×$5/16$). For example, when the display panel 100 is in the first defective state, the input luminance DBV is 80 nit, and the input grayscale GRAY is 9 grayscale, the individual weights may be $4/13$ and the weight WG may be 4(=13×$4/13$). For example, when the display panel 100 is in the first defective state, the input luminance DBV is 80 nit, and the input grayscale GRAY is 7 grayscale, the individual weight may be $3/10$ and the weight WG may be 3(=10×$3/10$). For example, when the display panel 100 is in the first defective state, the input luminance DBV is 80 nit, and the input grayscale GRAY is 3 grayscale, the individual weight may be $1/4$ and the weight WG may be 1(=4×$1/4$). For example, when the display panel 100 is in the first defective state, the input luminance DBV is 80 nit, and the input grayscale GRAY is 0 grayscale, the individual weight may be 0 and the weight WG may be 0(=0×1).

In addition to the weight WG described above, other input luminance DBV, other input grayscale GRAY, and other defect states may also be set in the same way as those described above. Therefore, any repetitive detailed description thereof will be omitted.

In an embodiment, as described above, the mura compensation device may generate the grayscale compensation value GCV depending on the grayscale data IMG to compensate the grayscale data IMG, apply the weight WG to the grayscale data IMG to compensate the grayscale data IMG in detail, and additionally or selectively apply the individual weight to the weight WG depending on the normal state or the defective states of the display panel 100 to improve the overcompensation of the grayscale data IMG due to application of the weight WG. Accordingly, in such an embodiment, the mura of the display device 10 may be effectively removed.

Figure 7:
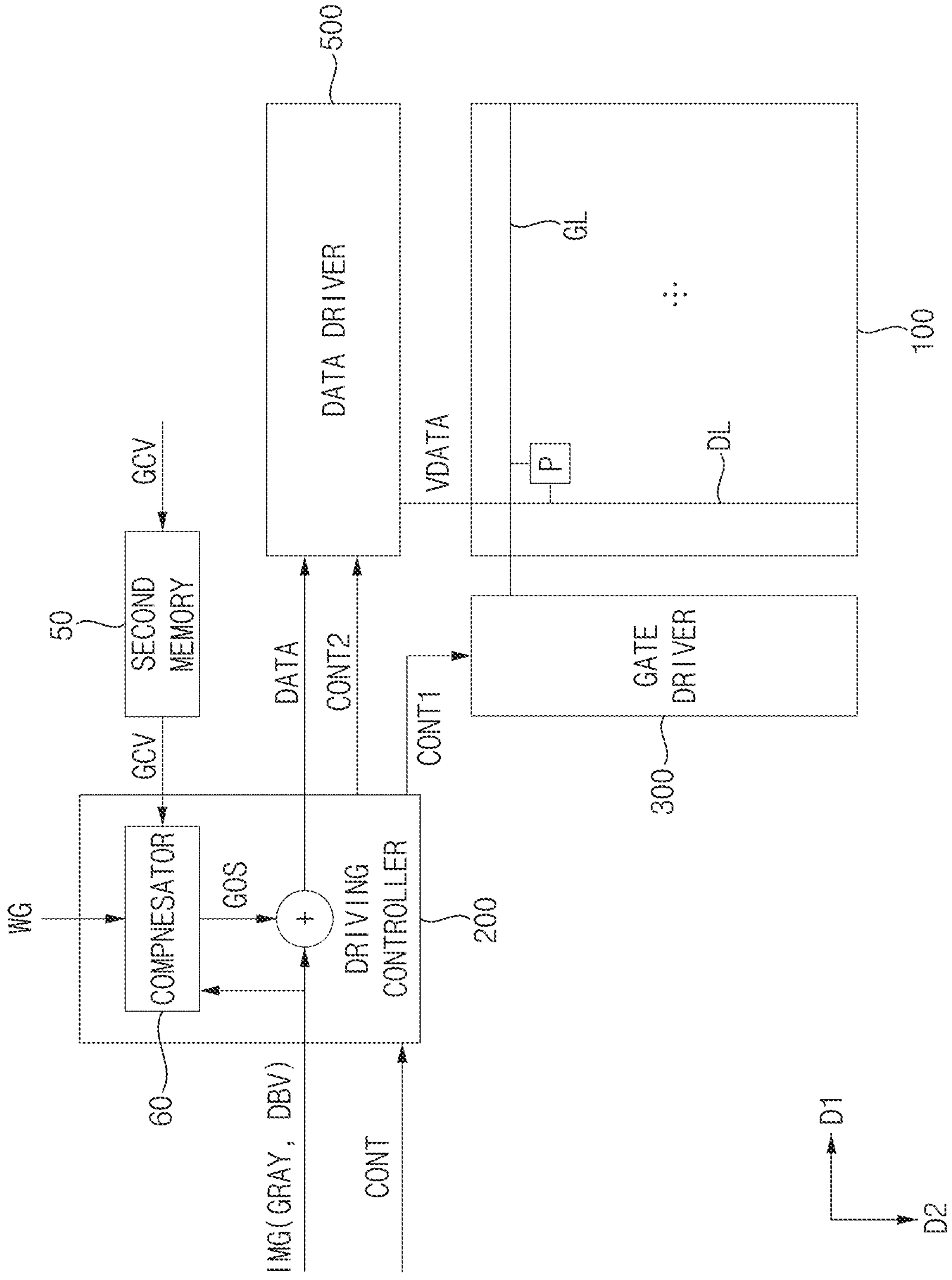
FIG. 7 is a block diagram illustrating a display device according to an embodiment of the invention.

FIG. 7 is a block diagram illustrating a display device according to an embodiment of the invention.

Referring to FIGS. 1 to 7, In an embodiment, a mura compensation system may include a display device 10, a camera 20, a computer, and a first memory 40. The display device 10 may include a display panel 100 and a display panel driver. In an embodiment, as shown in FIG. 7, the display panel driver may include a second memory 50, a driving controller 200, a gate driver 300, and a data driver 500.

The second memory 50 may receive a grayscale compensation value GCV from the first memory 40, which is an external device, and store the grayscale compensation value GCV The display panel 100 may include a display region for displaying an image and a peripheral region disposed adjacent to the display region.

The display panel 100 may include gate lines GL, data lines DL, and pixels P electrically connected to the gate lines GL and the data lines DL. The gate lines GL may extend in a first direction D1, and the data lines DL may extend in a second direction D2 crossing the first direction D1.

The driving controller 200 may receive the grayscale data IMG including the input grayscale GRAY and the input luminance DBV and an input control signal CONT from an external device. In an embodiment, for example, the grayscale data IMG may include red image data, green image data, and blue image data. In an embodiment, the grayscale data IMG may further include white image data. In an embodiment, for example, the grayscale data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may include a compensator 60. The compensator 60 may receive the grayscale compensation value GCV from the second memory 50 and a weight WG from the first memory 40. The compensator 60 may receive grayscale data IMG corresponding to each of M×N pixels P, generate the grayscale data IMG using the grayscale compensation value GCV and the weight WG, and compensate the grayscale data IMG by applying a grayscale offset GOS generated using the grayscale compensation value GCV and the weight WG to the grayscale data IMG.

The driving controller 200 may generate a first control signal CONT1, a second control signal CONT2, and a data signal DATA based on the grayscale data IMG and the input control signal CONT. The data signal DATA may be compensated grayscale data IMG.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the grayscale data IMG. The driving controller 200 may output the data signal DATA to the data driver 500.

The gate driver 300 may generate gate signals for driving the gate lines GL in response to the first control signal CONT1 received from the driving controller 200. The gate driver 300 may output the gate signals to the gate lines GL.

The data driver 500 may receive the second control signal CONT2 and the data signal DATA from the driving controller 200 and receive the gamma reference voltage VGREF from the gamma reference voltage generator 400. The data driver 500 may convert the data signal DATA into a data voltage VDATA in analog form. The data driver 500 may output the data voltage VDATA to the data line DL. Each of the pixels P may emit light based on a level of the data voltage VDATA.

In an embodiment, as described above, the mura compensation system may generate the grayscale compensation value GCV depending on the grayscale data IMG to compensate the grayscale data IMG, apply the weight WG to the grayscale data IMG to compensate the grayscale data IMG in detail, and additionally or selectively apply the individual weight to the weight WG depending on the normal state or the defective states of the display panel 100 to improve the overcompensation of the grayscale data IMG due to application of the weight WG. Accordingly, the mura of the display device 10 may be effectively removed.

Figure 8:
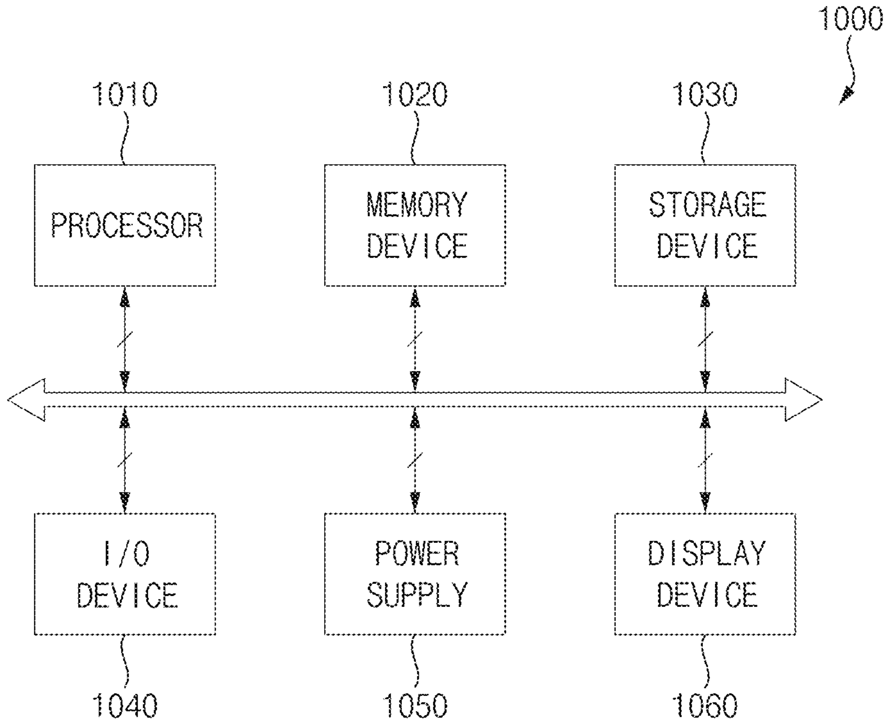
FIG. 8 is a block diagram illustrating an electronic device.
Figure 9:
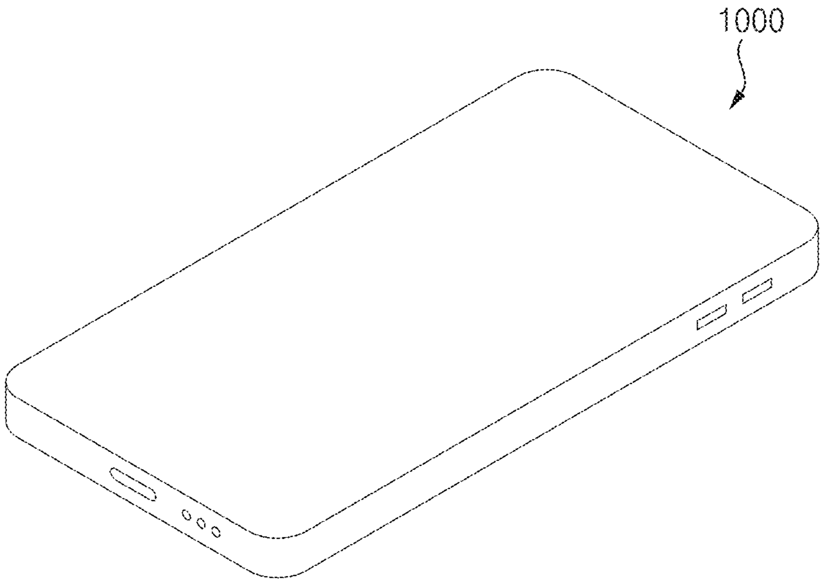
FIG. 9 is a diagram illustrating an embodiment in which the electronic device of FIG. 8 is implemented as a smart phone device.

FIG. 8 is a block diagram illustrating an electronic device. FIG. 9 is a diagram illustrating an embodiment in which the electronic device of FIG. 8 is implemented as a smart phone device.

Referring to FIGS. 9 and 10, an embodiment of the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, or the like.

In an embodiment, as illustrated in FIG. 10, the electronic device 1000 may be implemented as a smart phone. However, the electronic device 1000 is not limited thereto. For example, the electronic device 1000 may be implemented as a cellular phone, a video phone, a smart pad, a smart watch, a tablet personal computer (PC), a car navigation system, a computer monitor, a laptop, a head mounted display (TIMID) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. For example, the inventions may be applied to a mobile phone, a smart phone, a tablet computer, a digital television (TV), a three-dimensional (3D) TV, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A mura compensation device comprising:

a first memory which stores a grayscale compensation value of a reference pixel defined by m×n pixels included in a display panel, and a weight, wherein each of m and n is a positive integer equal to or greater than 2;

a second memory which receives the grayscale compensation value from the first memory and stores the grayscale compensation value; and a compensator which applies the grayscale compensation value and the weight to grayscale data to generate compensated grayscale data, wherein the compensator applies an individual weight to the weight depending on a normal state or defective states of the display panel to adjust the weight, the weight is selectively adjusted by the individual weight, and wherein the individual weight is a number between 0 and 1, and a value obtained by multiplying the individual weight and the weight is applied to the grayscale compensation value.

2. The mura compensation device of claim 1, further comprising:

a computer which obtains a luminance compensation value of the reference pixel based on a representative luminance value of the reference pixel, and obtains the grayscale compensation value based on the luminance compensation value of the reference pixel.

3. The mura compensation device of claim 2, wherein the representative luminance value of the reference pixel is an average luminance value, a maximum luminance value, or a minimum luminance value of the reference pixel.

4. The mura compensation device of claim 3, wherein the computer obtains a representative luminance value of a reference pixel located at a center of the display panel as a target luminance value of each of reference pixels.

5. The mura compensation device of claim 4, wherein the computer obtains a difference between the representative luminance value and the target luminance value as the luminance compensation value.

6. The mura compensation device of claim 1, wherein the grayscale data includes an input grayscale and an input luminance, which is a maximum luminance of an image generated based on the input grayscale, and wherein the weight is obtained based on the input luminance and the input grayscale.

7. The mura compensation device of claim 6, wherein the weight is obtained based on the input grayscale, the input luminance, and a driving frequency of the display panel.

8. The mura compensation device of claim 6, wherein the weight stored in the first memory is a reference weight corresponding to each of reference grayscales and each of reference luminances.

9. The mura compensation device of claim 8, wherein, when the input grayscale is equal to one of the reference grayscales and the input luminance is equal to one of the reference luminances, the compensator obtains the reference weight as the weight.

10. The mura compensation device of claim 9, wherein, when the input grayscale is different from the reference grayscales or the input luminance is different from the reference luminances, the compensator interpolates the reference grayscales and the reference luminances to obtain a weight corresponding to the input luminance and the input grayscale.

11. The mura compensation device of claim 1, wherein, when the display panel is driven in a brightness control mode including a dimming mode and a high brightness mode, the compensator further adjusts the weight.

12. The mura compensation device of claim 1, wherein the normal state and the defective states are classified by a quality assurance inspection of the display panel.

13. The mura compensation device of claim 12, wherein, when the display panel is in the normal state, the weight is not adjusted, and wherein, when the display panel is in one of the defective states, the weight is adjusted.

14. The mura compensation device of claim 13, wherein the individual weight is set differently depending on the defective states of the display panel.

15. The mura compensation device of claim 14, wherein the individual weight is stored in the compensator or the first memory.

16. The mura compensation device of claim 1, wherein the compensator acquires a grayscale compensation value of a specific pixel of the reference pixel and a grayscale compensation value of a specific pixel of a peripheral reference pixel adjacent to the reference pixel, and wherein the compensator interpolates the grayscale compensation value of the specific pixel of the reference pixel and the grayscale compensation value of the specific pixel of the peripheral reference pixel to obtain a grayscale compensation value of other pixels excluding the specific pixel of the reference pixel.

17. The mura compensation device of claim 16, wherein the grayscale compensation value stored in the first memory is a reference grayscale compensation value corresponding to each of reference grayscales.

18. The mura compensation device of claim 17, wherein, when an input grayscale of the specific pixel of the reference pixel or the peripheral reference pixel is equal to one of the reference grayscales, the compensator obtains the reference grayscale compensation value as the grayscale compensation value.

19. The mura compensation device of claim 18, wherein, when the input grayscale of the specific pixel of the reference pixel or the peripheral reference pixel is different from the reference grayscales, the compensator interpolates the reference grayscales to obtain a grayscale compensation value corresponding to the input grayscale of the specific pixel of the reference pixel or the peripheral reference pixel.

20. A mura compensation system comprising:

a first memory which stores a grayscale compensation value of a reference pixel defined by m×n pixels included in a display panel, and a weight, wherein each of m and n is a positive integer equal to or greater than 2;

a second memory which receives the grayscale compensation value from the first memory and stores the grayscale compensation value;

a compensator which applies the grayscale compensation value and the weight to grayscale data to generate compensated grayscale data; and a data driver which generates a data voltage based on the compensated grayscale data and applies the data voltage to the display panel, wherein the compensator applies an individual weight to the weight depending on a normal state or defective states of the display panel to adjust the weight, the weight is selectively adjusted by the individual weight, and wherein the individual weight is a number between 0 and 1, and a value obtained by multiplying the individual weight and the weight is applied to the grayscale compensation value.

* * * * *